(12) United States Patent
Ferlini

(10) Patent No.: US 12,415,679 B2
(45) Date of Patent: Sep. 16, 2025

(54) CONVEYOR CHAIN LINK AND CONVEYOR CHAIN COMPRISING SUCH A CHAIN LINK AND CONVEYOR SYSTEM

(71) Applicant: FlexLink AB, Gothenburg (SE)

(72) Inventor: Gianluca Ferlini, Bologna (IT)

(73) Assignee: FLEXLINK AB, Gothenburg (SE)

( * ) Notice: Subject to any disclaimer, the term of this patent is extended or adjusted under 35 U.S.C. 154(b) by 65 days.

(21) Appl. No.: 18/571,496

(22) PCT Filed: Jul. 11, 2022

(86) PCT No.: PCT/EP2022/069226
§ 371 (c)(1),
(2) Date: Dec. 18, 2023

(87) PCT Pub. No.: WO2023/285335
PCT Pub. Date: Jan. 19, 2023

(65) Prior Publication Data
US 2024/0278995 A1    Aug. 22, 2024

(30) Foreign Application Priority Data
Jul. 13, 2021 (SE) .................................. 2150936-9

(51) Int. Cl.
*B65G 17/44* (2006.01)
*B65G 17/08* (2006.01)
*B65G 17/40* (2006.01)

(52) U.S. Cl.
CPC ........... *B65G 17/44* (2013.01); *B65G 17/086* (2013.01); *B65G 17/40* (2013.01)

(58) Field of Classification Search
CPC ....... B65G 17/44; B65G 17/086; B65G 17/40
See application file for complete search history.

(56) References Cited

U.S. PATENT DOCUMENTS

| 4,754,872 A * | 7/1988 | Damkjaer | B65G 17/34 198/852 |
| 5,307,923 A * | 5/1994 | Damkjaer | B65G 17/086 198/852 |

(Continued)

FOREIGN PATENT DOCUMENTS

| CN | 104016071 A | 9/2014 | |
| EP | 2805899 A1 * | 11/2014 | ............. B65G 15/48 |

(Continued)

OTHER PUBLICATIONS

EPO Translation of CN104016071 (Year: 2025).*

(Continued)

*Primary Examiner* — Mark A Deuble
(74) *Attorney, Agent, or Firm* — ALSTON & BIRD LLP

(57) ABSTRACT

Conveyor chain link (1) provided with an upper body (2) and a lower body (3), where the chain link (1) is provided with an upper bearing surface (17), a front end (4) and a rear end (5), where the rear end (5) is provided with a first leg (6) and a second leg (7) arranged spaced apart from each other with a distance corresponding to the width of the front end (4), where the chain link (1) is adapted to be connected to an adjacent chain link (1) through a pivot member (12), where the front end (4) of the upper body (2) is provided with a plurality of front teeth (18) and front notches (19), where the rear end (5) of the upper body (2) is provided with a plurality of rear teeth (20) and rear notches (21), where the length of the teeth (18, 20) differs over the width of the chain link (1), where the ratio between the width of the chain link (1) and the number of teeth (20) of the rear end (5) is less than 10 mm/tooth. The advantage of the invention is that a conveyor chain link that will allow small objects to be conveyed on a conveyor chain is provided.

20 Claims, 5 Drawing Sheets

(56) References Cited

U.S. PATENT DOCUMENTS

| | | | | |
|---|---|---|---|---|
| 5,697,492 | A * | 12/1997 | Damkjaer | B65G 17/086 198/852 |
| 6,347,699 | B1 * | 2/2002 | Ramsey | B65G 17/44 198/852 |
| 6,871,736 | B2 * | 3/2005 | Fandella | B65G 17/086 198/853 |
| 7,779,990 | B2 * | 8/2010 | Ferrari | B65G 17/40 198/852 |
| 7,896,766 | B2 * | 3/2011 | Mitzschke | B65G 17/385 198/852 |
| 9,254,962 | B2 * | 2/2016 | Studer | B65G 17/066 |
| 9,290,327 | B2 * | 3/2016 | Abbestam | B65G 17/40 |
| 2008/0017482 | A1 * | 1/2008 | Fandella | B65G 17/086 198/851 |
| 2013/0277182 | A1 * | 10/2013 | Studer | B65G 17/066 198/850 |

FOREIGN PATENT DOCUMENTS

| | | | |
|---|---|---|---|
| EP | 3031752 A1 | 6/2016 | |
| EP | 4458736 A1 * | 11/2024 | ........... B65G 17/066 |
| JP | 2004-269259 A | 9/2004 | |
| WO | WO-2015/121788 A1 | 8/2015 | |

OTHER PUBLICATIONS

International Search Report and Written Opinion for International Application No. PCT/EP2-22/069226, dated Jul. 11, 2022, (14 pages), European Patent Office, Rijswijk, Netherlands.

Flexlink, "Conveyor Chain Guide," May 31, 2019, pp. 1-90, [Retrieved from the Internet Dec. 18, 2023] <URL: https://www.flex-lineautomation.com/wp-content/uploads/2019/05/Flexlink_Chain_GuideYeGIHg.pdf>.

* cited by examiner

CONVEYOR CHAIN LINK AND CONVEYOR CHAIN COMPRISING SUCH A CHAIN LINK AND CONVEYOR SYSTEM

CROSS REFERENCE TO RELATED APPLICATIONS

This application is a National Stage Application, filed under 35 U.S.C. § 371, of International Application No. PCT/EP2022/069226, filed Jul. 11, 2022, which international application claims priority to and the benefit of Swedish Application No. 2150936-9, filed Jul. 13, 2021; the contents of both of which as are hereby incorporated by reference in their entireties.

BACKGROUND

Related Field

The present invention relates to a conveyor chain link for a conveyor system comprising endless chains.

DESCRIPTION OF RELATED ART

Conveying devices, such as those that are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via carrying means, which are also known as pallets. A specific type of pallet is a puck, which is a round carrier adapted for smaller and more lightweight objects.

The conveyor chain is forwarded by a drive unit comprising a motor. The conveyor chins runs in conveyor beams and glides on slide rails attached to the conveyor beams. Both the conveyor chain and the slide rails may be made from a low friction material in order to reduce power consumption, to reduce wear and to reduce noise caused by vibrations. In the forward direction, i.e. when the chain transports objects, the underside of the upper body bears on upper slide rails of the conveyor beam. In the return direction, i.e. when the chain travels upside down in the return path, the upper side of the conveyor chain may be supported by a bearing surface on which the conveyor chain glides. The conveyor chain may also be provided with tabs or protrusions by which the chain may bear on an inner slide rail of the conveyor beam.

When conveying products in a straight line, a conveyor belt may be used. Often, there is a need to convey products around bends and curves, and sometimes also upwards or downwards. In such cases, a conveyor comprising a plurality of interconnected chain links must be used. One problem when conveying separate products through curves is that the product may get trapped between two chain links in a curve, when the distance between two chain links enlarges at one side of the chain. When the chain straightens out again, the trapped product may be damaged or may block the chain. This is especially troublesome for smaller products or deformable products. One such an example is smaller objects such as pills that are packed in blister packages. Each protruding pill enclosure is a potential problem.

One way of preventing smaller parts to get stuck in conveyor chains is to provide each conveyor chain link with extending teeth having notches in between them. A tooth is in this example adapted to interact with a notch of an adjacent chain link, which enlarges the useful bearing surface of the conveyor chain and allows the conveyor chain to bend in a curve. The teeth and notches minimizes the openings between the chain links, but only to an extent. Depending on the radius of the curve, there will still be openings between the chain links. For a conveyor chain that is adapted for smaller radiuses, the distance between the chain links at the outer side of the curve will be larger than for a larger radius. A radius of 400-500 mm is common.

A further problem with a smaller radius is that the pivot mechanism between two chain links must be able to negotiate the curve. In some chain links, the chain links are interconnected directly to each other with a pin. Other chain links are interconnected by the use of an additional pivot member, which allows for a chain link that can bend in a smaller radius. The pitch of a conveyor chain, i.e. the distance between the pivot points of the chain link will also affect the possible radius in which the conveyor chain can be used. In a curve, the distance between the chain links at the outer side of the chain will increase. The distance between the chain links at the outer side of the chain depends on the radius of the chain, the pitch of the chain and the width of the chain.

Some chain links are provided with overlapping surfaces, where the upper surface of one chain link extends over the lower surface of an adjacent chain link. These chain links can be used in horizontal curves, but cannot bend upwards in a vertical direction with the bearing surface directed inwards, towards the centre of the radius. Asymmetric chains have been proposed, but they can only be used in straight conveyors and in conveyors bending in one direction. This is not a flexible solution.

These solutions work fine in some systems, but are anyhow subjected to the above mentioned problem. There is thus still room for improvements.

BRIEF SUMMARY

An object of the invention is therefore to provide an improved conveyor chain link for a conveyor system. A further object of the invention is to provide an improved conveyor chain for a conveyor system. Another object of the invention is to provide a conveyor system comprising an improved conveyor chain.

The solution to the problem according to the invention is described in the characterizing part of claim 1. Claim 11 contains an advantageous conveyor chain and claim 15 contains an advantageous conveyor system. The other claims contain advantageous embodiments and further developments of the conveyor chain link and the conveyor chain.

In a conveyor chain link provided with an upper body and a lower body, where the chain link is provided with an upper bearing surface, a front end and a rear end, where the rear end is provided with a first leg and a second leg arranged spaced apart from each other with a distance corresponding to the width of the front end, where said first leg has a first protrusion facing outwards from the first leg and where the second leg has a second protrusion arranged opposite the first protrusion and facing outwards from the second leg, where the first protrusion is provided with a first through hole and the second protrusion is provided with a second through hole being coaxial with the first through hole, where the lower body comprises an opening adapted to hold a pivot member, where the first and the second through holes are adapted to hold a connecting pin, where the front end of the upper body is provided with a plurality of front teeth and front notches, where the rear end of the upper body is provided with a plurality of rear teeth and rear notches, where the length of the teeth differs over the width of the chain link, the object of the invention is achieved in that the ratio between the width of the chain link and the number of teeth of the rear end is less than 10 mm/tooth.

In other words, the Applicant has found that increasing the density of the plurality of rear teeth reduces the gap between the outermost rear tooth of a chain link and the corresponding outermost front tooth in the longitudinally adjacent chain link, both in a straight path and/or in a curve and thus reducing the risk of accidental pinching the transported products. This effect can be seen for example in FIG. 5.

In order to achieve a ratio between the width of the chain link and the number of teeth that is less than 10 mm/tooth, the Applicant has understood that the central part of the rear side of the chain link could be advantageously used to place further teeth so he understood for example that the rear side of the chain link could be provided with a central tooth while the front side of the chain link could be provided with a central notch.

Hence, unlike commonly known in prior art, the Applicant thought to invert, with respect to the conveying direction, the position of the central tooth (positioned in the rear side, unlike in prior art) and of the central notch (positioned in the front side, unlike in prior art).

Consequently, the chain link is provided with an odd number of teeth on the rear side (the ratio between the width of the chain link and the number of teeth being less than 10 mm/tooth) and an even number of teeth on the front side.

In this way a conveyor chain comprising a plurality of said conveyor chain links prevents a circular object with a diameter of 6 mm or more to enter between two adjacent chain links when the conveyor chain is bent in any direction.

In another aspect of the invention, the Applicant understood that the outermost rear tooth length reduction allows the conveyor chain to bend through sharper curves (see in FIG. 5 the effect on the inner curve of the bending conveyor chain). On the other hand, the outermost rear tooth being shorter not only increases the gap between two adjacent chain links on the outer side of the curve, but can also cause the outermost teeth to act as hooks, exposing then an operator to possible safety issues. For these reasons, the Applicant noticed that increasing the length of the outermost front tooth and continuously inclining the outer side edge of said tooth can advantageously allow to bend the chain through sharp curves while avoiding to create a gap between chain links (small objects can be conveyed) and avoiding safety issues (see in FIG. 5 the effect on the outer side of the bending conveyor chain).

Further preferred aspects of invention are disclosed in the following.

Preferably, the upper body comprises eight front teeth and nine rear teeth along the width of the chain link.

Preferably, the width of a chain link is defined by the distance between the two parallel outer side edges of the rear part of the chain link.

Preferably, the two outermost rear teeth of the plurality of rear teeth are at the two parallel outer side edges of the rear part of the chain link.

Preferably, the two outermost front teeth of the plurality of front teeth are at the two parallel outer side edges of the front part of the chain link.

Preferably, each outermost tooth comprises an outer side edge.

Preferably, the outer front side edge of the outermost front tooth is continuously inclined from the tip of the outermost front tooth to the side edge of the chain link, preferably to the rear side edge.

Preferably, the length of an outermost rear tooth is shorter than a second outermost rear tooth.

In other words, preferably, the length of an outermost rear tooth is shorter than the length of a second outermost rear tooth.

Preferably, the length of an outermost front tooth is longer than a second outermost front tooth.

In other words, preferably, the length of an outermost front tooth is longer than the length of a second outermost front tooth.

Preferably, the chain link is symmetric to a centre plane and the chain link is provided with a left section and a right section, where the right section is provided with a first front tooth, a second front tooth, a third front tooth and a fourth front tooth.

Preferably, the chain link is symmetric to a centre plane that is parallel to the travelling direction of the conveyor chain and the chain link is provided with a left section and a right section, where the right section is provided with a first front tooth, a second front tooth, a third front tooth and a fourth front tooth.

Preferably, the fourth front tooth is the outermost front tooth.

Preferably, the first front tooth is the tooth closest to the centre plane.

By this first embodiment of the conveyor chain link according to the invention, a conveyor chain link that allows small objects to be conveyed through curves is provided. With such conveyor chain links, conveyor chains that can run through sharp bends and still prevent small objects to be caught between two chain links can be obtained. With sharper bends, more compact conveyor systems can be designed. The conveyor chain is adapted for sharp bends both in a horizontal plane and for vertical bends. The conveyor chain is for this reason provided with a plurality of teeth, such that the ratio between the width of the chain link and the number of teeth of the rear end of the chain link is less than 10 mm/tooth. With this teeth ratio, the area between two adjacent chain links can be minimized, and the distance in any direction between two side surfaces of the adjacent chain links is such that a circular object with a diameter of 6 mm cannot enter between the chain links. This will prevent a small object to enter between two chain links in a bend and to be crushed between the chain links when the chain returns to a straight direction. If a solid object is caught between two chain links, the conveyor chain or the object may be damaged. If an objects of a deformable material enters between two chain links, such as blister packs, the object will deform if is caught between the chain links.

In the shown example, the rear end of the chain link is provided with nine teeth and the front end is provided with eight teeth. The chain is in the shown example 83 mm wide. With this tooth density, a relatively dense conveyor chain is obtained, where the ration between the width of the conveyor chain and the number of teeth at the rear end is less than 10 mm/tooth. The rear end of the chain link may also comprise ten teeth and the front end nine teeth. The pitch of the chain link is 33.5 mm.

In a typical prior art conveyor chain with a width of 83 mm and provided with 11 teeth, the free area between two adjacent chain links is normally greater than 650 mm$^2$, with a bearing surface of a chain link of 2130 mm$^2$. A larger free area increases the risk of crushing the transported objects.

The conveyor chain according to the present invention has a free area between two chain links of about 400 mm², with a flat bearing surface of each chain link of about 2370 mm², where each chain link is provided with 17 teeth, 8 at the front and 9 at the rear.

With the inventive conveyor chain having a higher number of teeth than a conventional conveyor chain with the same width, the bearing surface is increased and the free area between two adjacent chain links is reduced. In one example, at least some teeth have a lateral profile that is composed of mixed lines comprising a plurality of segments. In addition to the plurality of segments, the profiles of the teeth can also be composed with curvilinear portions.

In order to decrease the distance between two adjacent chain link further, it is possible to provide one or more teeth of the chain link with broken side surfaces having two or more straight segments or having a curved side surface. This will allow a decreased distance between the surfaces of two chain links when the conveyor chain bends.

BRIEF DESCRIPTION OF DRAWINGS

The invention will be described in greater detail in the following, with reference to the embodiments that are shown in the attached drawings, in which.

DETAILED DESCRIPTION OF VARIOUS EMBODIMENTS

The embodiments of the invention with further developments described in the following are to be regarded only as examples and are in no way to limit the scope of the protection provided by the patent claims. References such as longitudinal, horizontal, vertical, right, left etc. refer to directions of a conveyor in normal use, conveying objects in a horizontal plane.

Figure 1:
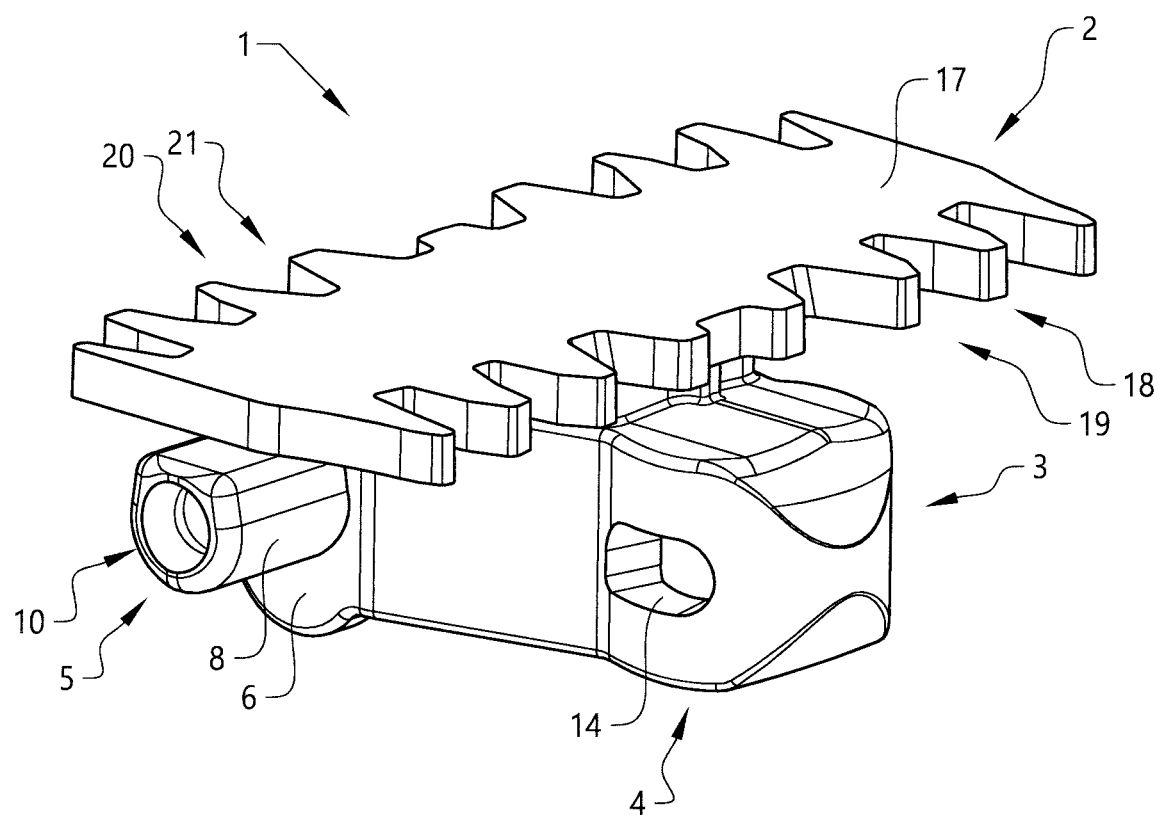
FIG. 1 shows a view of a chain link according to the invention.
Figure 2:
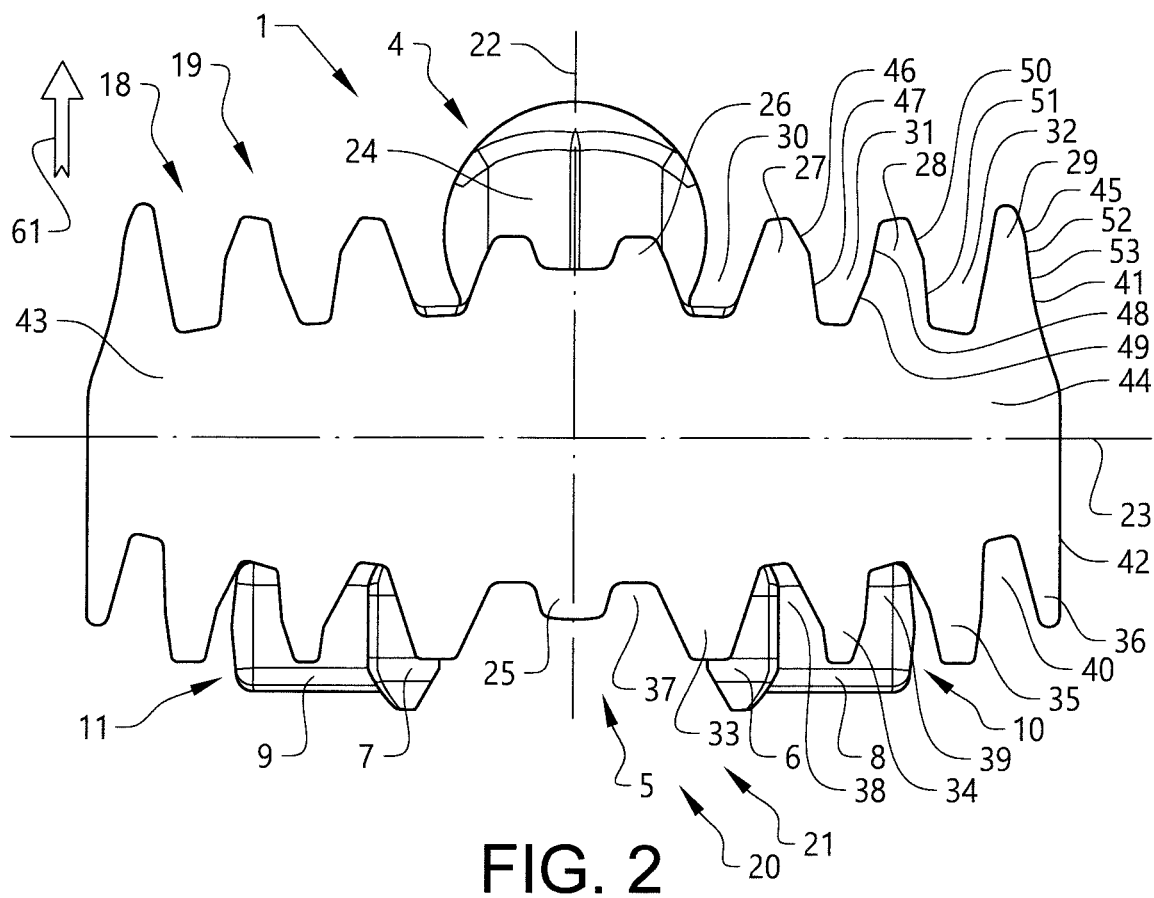
FIG. 2 shows an upper view of a chain link according to the invention.
Figure 3:
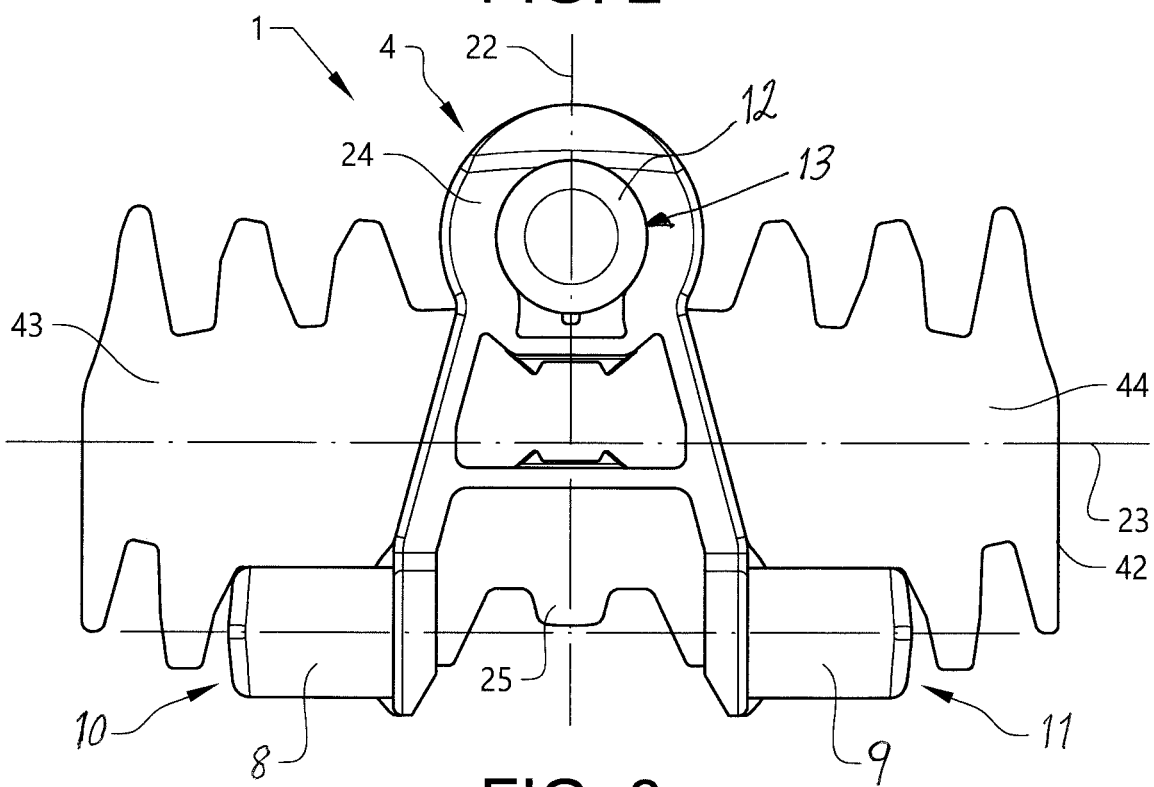
FIG. 3 shows a lower view of a chain link according to the invention.
Figure 4:
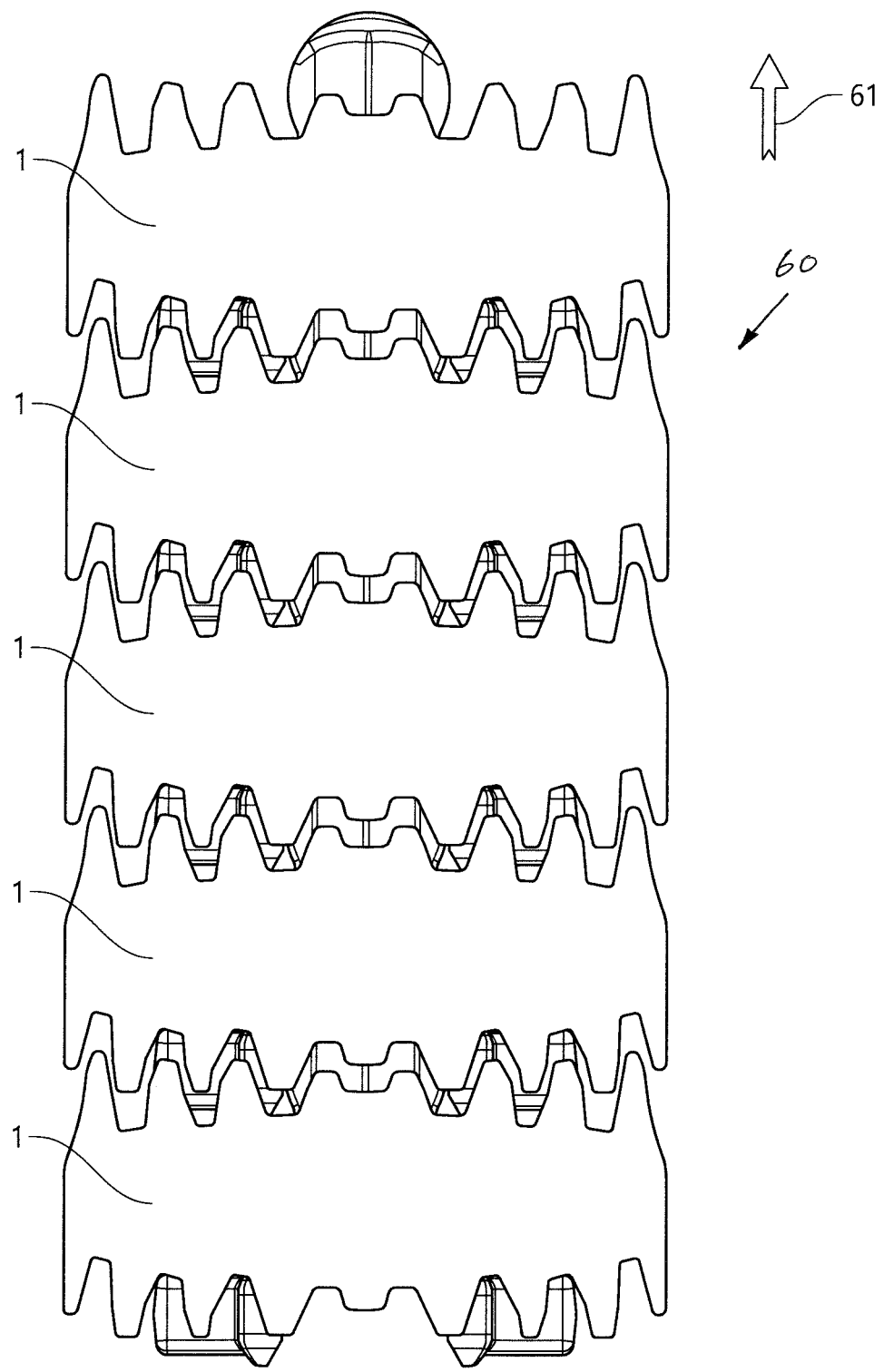
FIG. 4 shows an upper view of a straight conveyor chain according to the invention.
Figure 5:
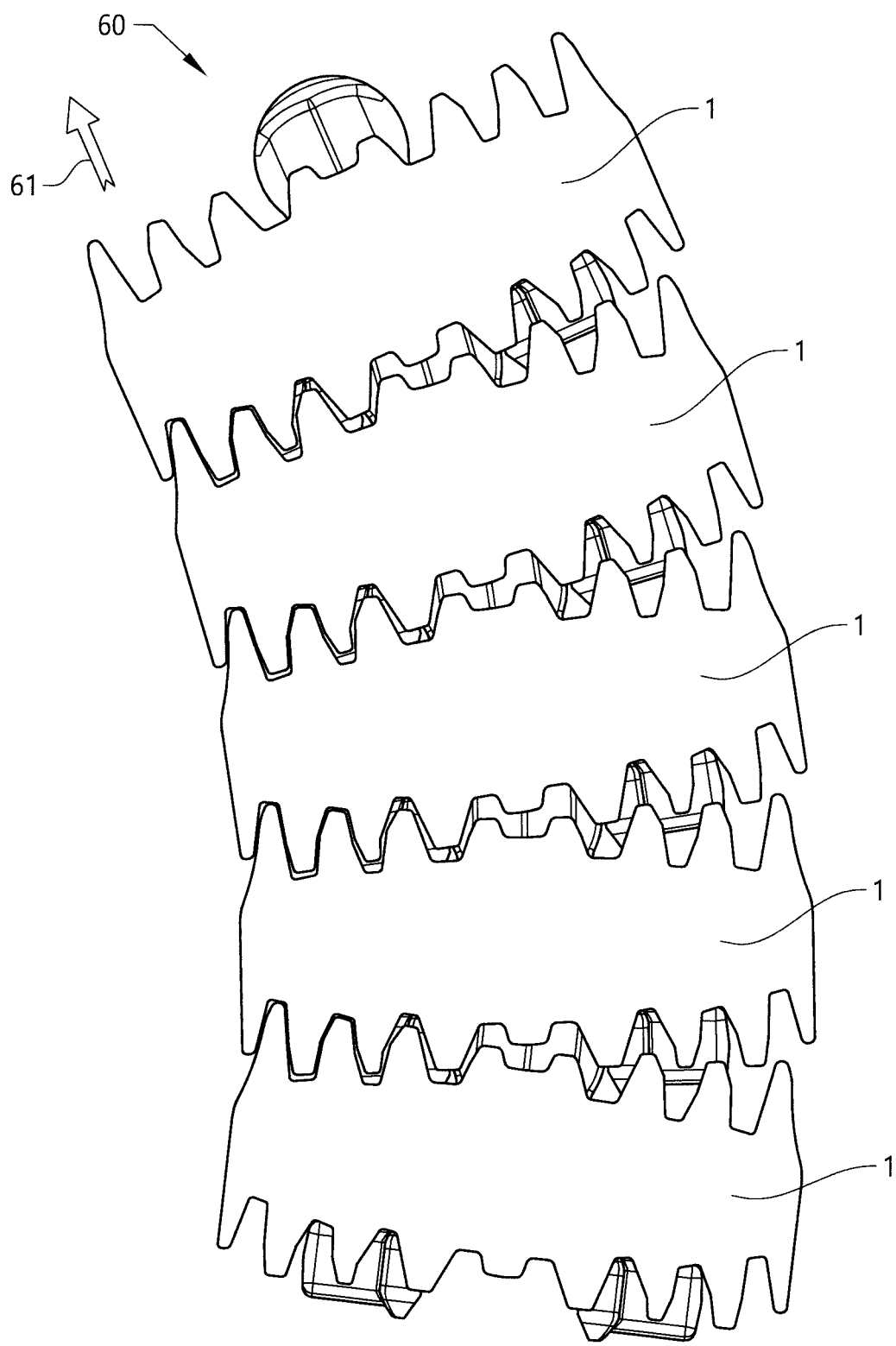
FIG. 5 shows an upper view of a conveyor chain in a horizontal bend according to the invention.
Figure 6:
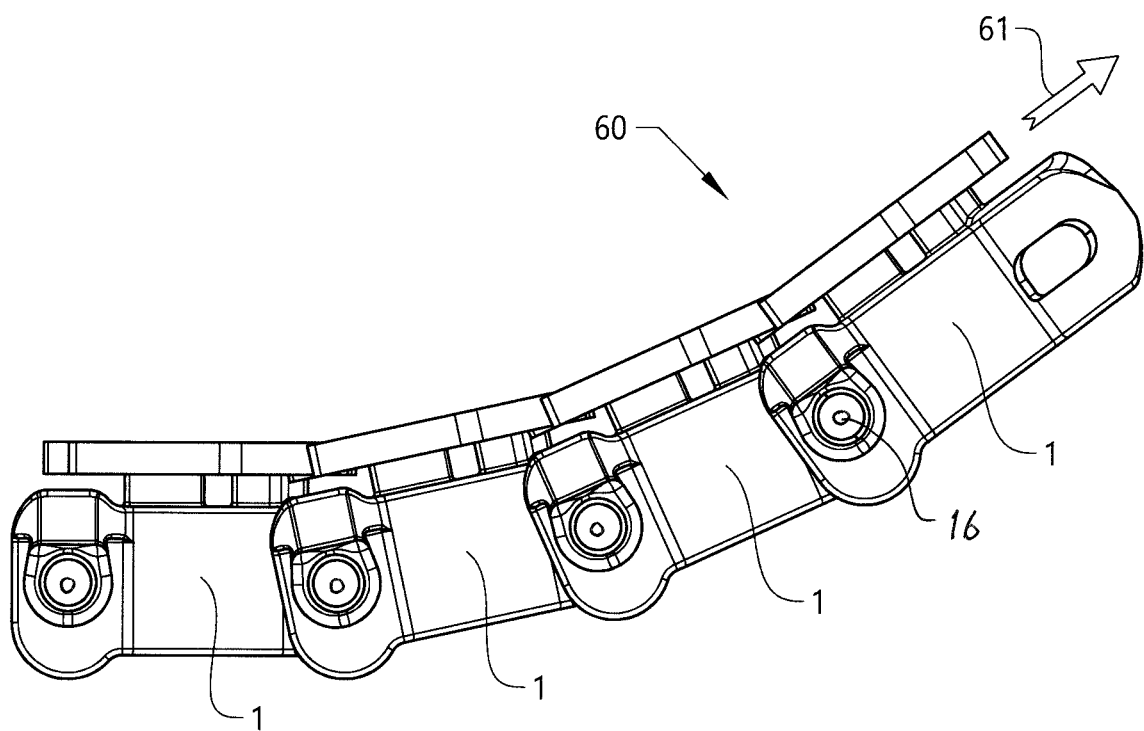
FIG. 6 shows a side view of a conveyor chain in a vertical bend according to the invention.

FIGS. 1 to 3 show an example of a conveyor chain link according to the invention, and FIGS. 4 to 6 show an example of a conveyor chain according to the invention. The conveyor chain link is intended to be used in endless conveyor chains for conveying objects on a chain conveyor. With the design of the chain link, a conveyor chain that can carry small objects through sharp bends is obtained. This simplifies the transport of small objects and allows for compact conveyor systems. In this application, a small object is an object having a diameter of 6 mm. Objects having a larger diameter can of course also be conveyed by such a conveyor chain.

In FIGS. 1 to 3, a conveyor chain link 1 that can form part of a conveyor chain is shown. The chain link has an upper body 2 with an upper bearing surface 17 adapted to carry objects that are to be conveyed. The upper bearing surface is preferably shaped like a substantially flat surface for supporting objects. The upper bearing surface may be made in the same material as the body of the chain link, or may be provided with a different material having a higher friction value, such as rubber or a soft plastic. The upper bearing surface is provided with a front side and a rear side. The front side is provided with a plurality of front teeth 18 and front notches 19 arranged adjacent to the front side, and the rear side is provided with a plurality of rear teeth 20 and rear notches 21 arranged adjacent to the rear side. The notches and the teeth are arranged to mesh with the corresponding front and rear teeth and notches of adjacent chain links. The chain link 1 comprises a centre plane 22 that is parallel to the travelling direction of a conveyor chain and a transverse plane 23 that is perpendicular to the centre plane 22 and to the travelling direction of a conveyor chain. The centre plane divides the conveyor chain link 1 in a left section 43 and a right section 44, where left and right refers to the normal travelling direction of a conveyor chain with the front end 4 of the conveyor chain link directed in the travelling direction.

The conveyor chain link is further provided with a lower body 3 provided with a front end 4 and a rear end 5. The front end 4 is provided with a circular opening 13 that is arranged to hold a pivot member 12, which is provided with a transverse through hole. The through hole of the pivot member is adapted to hold a connecting pin 16. The sides of the front end is further provided with transverse pivot openings 14 through which the connecting pin will extend. The rear end 5 has a first leg 6 and a second leg 7 arranged at a certain distance from each other, with the legs bifurcating out from the front end 4. The distance between the first leg and the second leg is such that the front end of a chain link fits between the first and second legs of an adjacent chain link when mounted in a conveyor chain.

The first leg 6 has a first protrusion 8 arranged substantially perpendicular to the centre plane 22 and facing outwards from the first leg. The protrusion is advantageously utilized as transport facilitating means, i.e. used as engagement means for cooperation with a drive wheel or the like, for example interacting with a cogwheel of a conveyor drive unit. The protrusion is further advantageously adapted to function as a sliding surface bearing on a slide rail in the return path of a conveyor chain. The first protrusion 8 has a first through hole 10, which may have a circular or a non-circular cross-section, e.g. a substantially triangular shape, even though other shapes are also plausible. The second leg 7 has a second protrusion 9 arranged opposite to the first protrusion 8 and facing outwards from the second leg. The second protrusion 9 has a second through hole 11 substantially coaxial with the first through hole 10 of the first protrusion 8 and of the same cross-section. The protrusions extend uniformly such that the protrusions resemble a tube shaped protrusion. A connecting pin 16 adapted to connect two adjacent chain links will extend through the first and second through holes, the transverse pivot openings of the front end and the transverse through hole of the pivot member. The connecting pin may either be secured by the transverse through hole or the first and second through holes 10, 11.

The upper body 2 comprises a plurality of teeth and notches, in the shown example eight front teeth 18 and seven front notches 19 arranged adjacent the front side. The upper body further comprises and nine rear teeth 20 and eight rear notches 21 arranged adjacent the rear side. The ratio between the width of the chain link and the number of teeth at the rear side is less than 10 mm/tooth, and more preferably less than 9.5 mm/tooth. The width of a chain link is defined by the distance between the two parallel outer side edges 42 of the rear part of the chain link. With this ratio, it can be ensured that a sufficient dense conveyor chain can be obtained by the chain links. In the shown example, the width of the chain link is 83 mm. A wider chain link requires more teeth to obtain the same teeth density. It is also possible to provide the upper body with nine front teeth and ten rear teeth. More teeth for the same width will mean that each tooth must be narrower, which causes problems when the chain links are injection moulded. The conveyor chain link is preferably made from a material having a low coefficient of friction, such as an acetal plastic and/or polyamide.

The pitch of the chain link, i.e. the distance between the front pivot point and the rear pivot point of the chain link, is 33.5 mm. The ration between the pitch of the chain link and the number of teeth at the rear side is less than 3.5 mm/tooth. This will provide a conveyor chain that can travel through sharp curves but that still provides a relatively dense chain in the bends. The purpose of a chain link is to provide a conveyor chain that will stop objects with a diameter smaller than 6 mm to enter between two conveyor chains in a curve, when the chain is bent to its maximum.

Since the conveyor chain link is symmetrical, only the right section 44 will be described in detail. The rear side is provided with a central rear tooth 25, a first rear tooth 33, a second rear tooth 34, a third (or second outermost) rear tooth 35 and a fourth outermost rear tooth 36. Between the central rear tooth 25 and the first rear tooth 33, a first rear notch 37 is provided. Between the first rear tooth 33 and the second rear tooth 34, a second rear notch 38 is provided. Between the second rear tooth 34 and the third rear tooth 35, a third notch 39 is provided, and between the third rear tooth 35 and the fourth or outermost rear tooth 36, a fourth rear notch 40 is provided. The extension of the rear teeth except for the fourth or outermost rear tooth, i.e. the distance from the transverse plane 23 to the tip of the teeth is substantially the same, with the extension of the fourth or outermost tooth being shorter. The distance from the centre of a notch to the transverse plane 23 decreases outwards from the first rear notch 37, i.e. the depth of each notch increases outwards from the centre plane.

The front side is provided with a first front tooth 26, a second front tooth 27, a third (or second outermost) front tooth 28 and a fourth or outermost front tooth 29. Between the two first front teeth 26, a central notch 24 is provided. Between the first front tooth 26 and the second front tooth 27, a first front notch 30 is provided. Between the second front tooth 27 and the third front tooth 28, a second front notch 31 is provided, and between the third front tooth 28 and the fourth or outermost front tooth 29, a third front notch 32 is provided. The extension of the front teeth, i.e. the distance from the transverse plane 23 to the tip of the teeth increases outwards from the first tooth 26, where the first front tooth 26 is the shortest and the fourth or outermost front tooth 29 is the longest. The distance from the centre of a notch to the transverse plane 23 decreases slightly outwards from the centre plane.

In order to allow for a conveyor chain that can travel through sharp curves, the shape of a tooth or a notch must not be symmetrical. Especially one or more of the outer teeth may be provided with side edges that are curved or broken. In the shown example, the outer side edge of the second front tooth 27 is provided with an outer first edge segment 46 and an inner second edge segment 47 having different inclinations with regards to the centre plane 22. The inner side edge of the third front tooth 28 is provides with an outer third edge segment 48 and an inner fourth edge segment 49 having different inclinations with regards to the centre plane 22. The outer side edge of the third front tooth 28 is provides with an outer fifth edge segment 50 and an inner sixth edge segment 51 having different inclinations with regards to the centre plane 22.

The side edges of the second rear tooth 34 and the third rear tooth 35 are also provided with differently inclined edge segments in the same way. This will allow the teeth and notches of two adjacent chain links to be closer to each other when a conveyor chain bends, which will further help to prevent smaller objects to enter between two chain links. The outer side of the upper body 2 is provided with a rear side edge 42 that is parallel to the centre plane 22, and a front side edge 41 that is continuously inclined from the rear side edge to the tip of the fourth or outermost front tooth 29. The shape of the fourth or outermost rear tooth 36 and the fourth or outermost front tooth 29 will also help to prevent objects from entering between tow chain links when a conveyor chain bends.

A plurality of conveyor chain links 1 are attached to each other as shown in FIGS. 4 to 6 in order to create a conveyor chain 60. Such a conveyor chain is adapted to travel in a conveyor beam provided with slide rails. One or more conveyor chains with conveyor beams make up a conveyor system, which also comprises curves and may comprise other functional elements, such as diverters, stops, drive units, handling stations etc. The conveyor system is used for moving objects between different stations in e.g. a factory. Such conveyor systems are well known in the art.

FIG. 4 shows a conveyor chain 60 arranged to travel in a straight moving direction 61. The free area between two chain links is in the shown example, with an 83 mm wide chain, approximately 400 $mm^2$, where the bearing surface of the upper body is approximately 2370 $mm^2$. The ratio between the bearing surface and the free area is preferably larger than 5. The distance between the teeth and notches of two adjacent chain links in the longitudinal direction ensures that the conveyor chain can travel in an upward curve, i.e. in a vertical direction. A smaller distance will limit the radius of the vertical curve.

FIG. 5 shows a bent conveyor chain arranged to travel in a horizontal curve. The conveyor chain is designed with a horizontal turning radius of minimum 250 mm. Since the chain links are symmetrical, the curves may bend both to the right and to the left. When the conveyor chain is bent, the free area between two chain links remains the same as for a straight conveyor chain, but the distance between the teeth and notches at the inside and outside of the curve changes. At the inside, the distance between the teeth and notches decreases, and the tip of a tooth may even bear on the bottom of a notch. At the outside, the distance between the tip of a tooth and the bottom of a notch increases. However, due to the spacing of the teeth and notches, a small object is still prevented to extend into the space between two chain links. It will thus be possible to convey objects with a diameter of 6 mm through the curve in a reliable manner.

FIG. 6 shows a side view of a conveyor chain arranged to travel in vertical curve, with the bearing surface 17 facing inwards, towards the centre of the vertical curve. The conveyor chain is designed with a vertical turning radius of less than 200 mm. In this way, sharp upwards bends may be used in the conveyor system. In the upward curve, the teeth and the notches will mesh such that small objects are prevented from entering between two adjacent chain links. An upward curve is always straight.

The invention is not to be regarded as being limited to the embodiments described above, a number of additional variants and modifications being possible within the scope of the subsequent patent claims. The chain link may have any size and may be made from any suitable material.

REFERENCE SIGNS

1: Conveyor chain link
2: Upper body
3: Lower body
4: Front end
5: Rear end
6: First leg
7: Second leg
8: First protrusion
9: Second protrusion
10: First through hole
11: Second through hole
12: Pivot member
13: Opening
14: Transverse pivot opening
16: Connecting pin
17: Upper bearing surface
18: Front teeth
19: Front notches
20: Rear teeth
21: Rear notches
22: Centre plane
23: Transverse plane
24: Central front notch
25: Central rear tooth
26: First front tooth
27: Second front tooth
28: Third front tooth
29: Fourth front tooth
30: First front notch
31: Second front notch
32: Third front notch
33: First rear tooth
34: Second rear tooth
35: Third rear tooth
36: Fourth rear tooth
37: First rear notch
38: Second rear notch
39: Third rear notch
40: Fourth rear tooth
41: Front side edge
42: Rear side edge
43: Left section
44: Right section
45: Tip
46: First edge segment
47: Second edge segment
48: Third edge segment
49: Fourth edge segment
50: Fifth edge segment
51: Sixth edge segment
52: Seventh edge segment
53: Eighth edge segment
60: Conveyor chain
61: Moving direction

The invention claimed is:

1. A conveyor chain link (1) provided with an upper body (2) and a lower body (3), where the chain link (1) is provided with an upper bearing surface (17), a front end (4) and a rear end (5), where the rear end (5) is provided with a first leg (6) and a second leg (7) arranged spaced apart from each other with a distance corresponding to the width of the front end (4), where said first leg (6) has a first protrusion (8) facing outwards from the first leg (6) and where the second leg (7) has a second protrusion (9) arranged opposite the first protrusion (8) and facing outwards from the second leg (7), where the first protrusion (8) is provided with a first through hole (10) and the second protrusion (9) is provided with a second through hole (11) being coaxial with the first through hole (10), where the lower body comprises an opening (13) adapted to hold a pivot member (12), where the first and the second through holes (10, 11) are adapted to hold a connecting pin (16), where the front end (4) of the upper body (2) is provided with a plurality of front teeth (18) and front notches (19), where the rear end (5) of the upper body (2) is provided with a plurality of rear teeth (20) and rear notches (21), where the length of the teeth (18, 20) differs over the width of the chain link (1), wherein the ratio between the width of the chain link (1) and the number of teeth (20) of the rear end (5) is less than 10 mm/tooth, and wherein the front end (4) is provided with eight teeth (18).

2. The conveyor link according to claim 1, wherein the length of an outermost rear tooth (36) is shorter than a second outermost rear tooth (35).

3. The conveyor chain link according to claim 1, wherein the chain link (1) is symmetric to a centre plane (22) and that the chain link (1) is provided with a left section (43) and a right section (44), where the right section (44) is provided with a first front tooth (26), a second front tooth (27), a third front tooth (28) and a fourth front tooth (29), and either:
   the outer front side edge (41) of the fourth front tooth (29) is continuously inclined from the tip (45) of the fourth front tooth (29) to the side edge (42) of the chain link (1); or
   at least one of the second front tooth (27), the third front tooth (28) or the fourth front tooth (29) is provided with a side edge that is either bent in different segments (46, 47; 48, 49; 50, 51; 52, 53) or curved.

4. The conveyor chain link according to claim 1, wherein one of:
   a pitch of the chain link (1) is 33.5 mm;
   the ratio between a pitch of the chain link (1) and the number of teeth (20) of the rear end (5) is less than 3.5 mm/tooth; or
   the upper bearing surface (17) is provided with a material that differs from the material of the upper body (2) and the material of the lower body (3).

5. A conveyor chain (60), wherein the conveyor chain (60) comprises a plurality of conveyor chain links (1) according to claim 1, where each conveyor chain link (1) is connected to an adjacent conveyor chain link (1) by a pivot member (12) arranged in the pivot opening (13) in the lower body (3) and a connecting pin (16) arranged through the first through hole (10), the second through hole (11), a transverse through hole of the pivot member (12), and transverse pivot openings (14) of the lower body (3).

6. The conveyor chain (60) according to claim 5, wherein the conveyor chain (60) prevents a circular object with a diameter of 6 mm or more to enter between two adjacent chain links (1) when the conveyor chain is bent in any direction.

7. A conveyor system, wherein the conveyor system comprises at least one conveyor chain (60) according to claim 5, a conveyor beam holding the conveyor chain (60), and a drive unit arranged to drive the conveyor chain (60).

8. A conveyor chain link (1) provided with an upper body (2) and a lower body (3), where the chain link (1) is provided with an upper bearing surface (17), a front end (4) and a rear end (5), where the rear end (5) is provided with a first leg (6) and a second leg (7) arranged spaced apart from each other with a distance corresponding to the width of the front end (4), where said first leg (6) has a first protrusion (8) facing outwards from the first leg (6) and where the second leg (7) has a second protrusion (9) arranged opposite the first protrusion (8) and facing outwards from the second leg (7), where the first protrusion (8) is provided with a first through hole (10) and the second protrusion (9) is provided with a second through hole (11) being coaxial with the first through hole (10), where the lower body comprises an opening (13) adapted to hold a pivot member (12), where the first and the second through holes (10, 11) are adapted to hold a connecting pin (16), where the front end (4) of the upper body (2) is provided with a plurality of front teeth (18) and front notches (19), where the rear end (5) of the upper body (2) is provided with a plurality of rear teeth (20) and rear notches (21), where the length of the teeth (18, 20) differs over the width of the chain link (1), wherein the ratio between the width of the chain link (1) and the number of teeth (20) of the rear end (5) is less than 10 mm/tooth, and wherein the chain link (1) is symmetric to a centre plane (22) and that the chain link (1) is provided with a left section (43) and a right section (44), where the right section (44) is provided with a first front tooth (26), a second front tooth (27), a third front tooth (28) and a fourth front tooth (29).

9. The conveyor chain link according to claim 8, wherein either:
    the outer front side edge (41) of the fourth front tooth (29) is continuously inclined from the tip (45) of the fourth front tooth (29) to the side edge (42) of the chain link (1); or
    at least one of the second front tooth (27), the third front tooth (28) or the fourth front tooth (29) is provided with a side edge that is either bent in different segments (46, 47; 48, 49; 50, 51; 52, 53) or curved.

10. The conveyor chain link according to claim 8, wherein one or more of:
    the length of an outermost rear tooth (36) is shorter than a second outermost rear tooth (35);
    a pitch of the chain link (1) is 33.5 mm;
    the ratio between a pitch of the chain link (1) and the number of teeth (20) of the rear end (5) is less than 3.5 mm/tooth; or
    the upper bearing surface (17) is provided with a material that differs from the material of the upper body (2) and the material of the lower body (3).

11. A conveyor chain link (1) provided with an upper body (2) and a lower body (3), where the chain link (1) is provided with an upper bearing surface (17), a front end (4) and a rear end (5), where the rear end (5) is provided with a first leg (6) and a second leg (7) arranged spaced apart from each other with a distance corresponding to the width of the front end (4), where said first leg (6) has a first protrusion (8) facing outwards from the first leg (6) and where the second leg (7) has a second protrusion (9) arranged opposite the first protrusion (8) and facing outwards from the second leg (7), where the first protrusion (8) is provided with a first through hole (10) and the second protrusion (9) is provided with a second through hole (11) being coaxial with the first through hole (10), where the lower body comprises an opening (13) adapted to hold a pivot member (12), where the first and the second through holes (10, 11) are adapted to hold a connecting pin (16), where the front end (4) of the upper body (2) is provided with a plurality of front teeth (18) and front notches (19), where the rear end (5) of the upper body (2) is provided with a plurality of rear teeth (20) and rear notches (21), where the length of the teeth (18, 20) differs over the width of the chain link (1), wherein the ratio between the width of the chain link (1) and the number of teeth (20) of the rear end (5) is less than 10 mm/tooth, and wherein the chain link (1) is 83 mm wide.

12. The conveyor chain link according to claim 11, wherein either:
    the outer front side edge (41) of the fourth front tooth (29) is continuously inclined from the tip (45) of the fourth front tooth (29) to the side edge (42) of the chain link (1); or
    at least one of the second front tooth (27), the third front tooth (28) or the fourth front tooth (29) is provided with a side edge that is either bent in different segments (46, 47; 48, 49; 50, 51; 52, 53) or curved.

13. The conveyor chain link according to claim 11, wherein one or more of:
    the length of an outermost rear tooth (36) is shorter than a second outermost rear tooth (35);
    a pitch of the chain link (1) is 33.5 mm;
    the ratio between a pitch of the chain link (1) and the number of teeth (20) of the rear end (5) is less than 3.5 mm/tooth; or
    the upper bearing surface (17) is provided with a material that differs from the material of the upper body (2) and the material of the lower body (3).

14. The conveyor chain link according to claim 11, wherein:
    the chain link (1) is symmetric to a centre plane (22) and that the chain link (1) is provided with a left section (43) and a right section (44), where the right section (44) is provided with a first front tooth (26), a second front tooth (27), a third front tooth (28) and a fourth front tooth (29), and
    either:
    the outer front side edge (41) of the fourth front tooth (29) is continuously inclined from the tip (45) of the fourth front tooth (29) to the side edge (42) of the chain link (1); or
    at least one of the second front tooth (27), the third front tooth (28) or the fourth front tooth (29) is provided with a side edge that is either bent in different segments (46, 47; 48, 49; 50, 51; 52, 53) or curved.

15. A conveyor chain (60) comprising:
    a plurality of conveyor chain links (1), each of the plurality of conveyor chain links (1) comprising an upper body (2) and a lower body (3), where the chain link (1) is provided with an upper bearing surface (17), a front end (4) and a rear end (5), where the rear end (5) is provided with a first leg (6) and a second leg (7) arranged spaced apart from each other with a distance corresponding to the width of the front end (4), where said first leg (6) has a first protrusion (8) facing outwards from the first leg (6) and where the second leg (7) has a second protrusion (9) arranged opposite the first protrusion (8) and facing outwards from the second leg (7), where the first protrusion (8) is provided with a first through hole (10) and the second protrusion (9) is provided with a second through hole (11) being coaxial with the first through hole (10), where the lower body comprises an opening (13) adapted to hold a pivot member (12), where the first and the second through holes (10, 11) are adapted to hold a connecting pin (16), where the front end (4) of the upper body (2) is provided with a plurality of front teeth (18) and front notches (19), where the rear end (5) of the upper body (2) is provided with a plurality of rear teeth (20) and rear notches (21), where the length of the teeth (18, 20) differs over the width of the chain link (1), and wherein the ratio between the width of the chain link (1) and the number of teeth (20) of the rear end (5) is less than 10 mm/tooth, wherein:
- each conveyor chain link (1) is connected to an adjacent conveyor chain link (1) by a pivot member (12) arranged in the pivot opening (13) in the lower body (3) and a connecting pin (16) arranged through the first through hole (10), the second through hole (11), a transverse through hole of the pivot member (12), and transverse pivot openings (14) of the lower body (3); and
- the conveyor chain (60) has a horizontal turning radius of less than 300 mm.

16. The conveyor chain (60) according to claim 15, wherein the conveyor chain (60) prevents a circular object with a diameter of 6 mm or more to enter between two adjacent chain links (1) when the conveyor chain is bent in any direction.

17. A conveyor system, wherein the conveyor system comprises at least one conveyor chain (60) according to claim 15, a conveyor beam holding the conveyor chain (60), and a drive unit arranged to drive the conveyor chain (60).

18. A conveyor chain (60) comprising:
- a plurality of conveyor chain links (1), each of the plurality of conveyor chain links (1) comprising an upper body (2) and a lower body (3), where the chain link (1) is provided with an upper bearing surface (17), a front end (4) and a rear end (5), where the rear end (5) is provided with a first leg (6) and a second leg (7) arranged spaced apart from each other with a distance corresponding to the width of the front end (4), where said first leg (6) has a first protrusion (8) facing outwards from the first leg (6) and where the second leg (7) has a second protrusion (9) arranged opposite the first protrusion (8) and facing outwards from the second leg (7), where the first protrusion (8) is provided with a first through hole (10) and the second protrusion (9) is provided with a second through hole (11) being coaxial with the first through hole (10), where the lower body comprises an opening (13) adapted to hold a pivot member (12), where the first and the second through holes (10, 11) are adapted to hold a connecting pin (16), where the front end (4) of the upper body (2) is provided with a plurality of front teeth (18) and front notches (19), where the rear end (5) of the upper body (2) is provided with a plurality of rear teeth (20) and rear notches (21), where the length of the teeth (18, 20) differs over the width of the chain link (1), and wherein the ratio between the width of the chain link (1) and the number of teeth (20) of the rear end (5) is less than 10 mm/tooth, wherein:
- each conveyor chain link (1) is connected to an adjacent conveyor chain link (1) by a pivot member (12) arranged in the pivot opening (13) in the lower body (3) and a connecting pin (16) arranged through the first through hole (10), the second through hole (11), a transverse through hole of the pivot member (12), and transverse pivot openings (14) of the lower body (3); and
- the conveyor chain (60) has a vertical turning radius of less than 200 mm with the bearing surface (17) facing inwards towards the centre of the curvature.

19. The conveyor chain (60) according to claim 18, wherein the conveyor chain (60) prevents a circular object with a diameter of 6 mm or more to enter between two adjacent chain links (1) when the conveyor chain is bent in any direction.

20. A conveyor system, wherein the conveyor system comprises at least one conveyor chain (60) according to claim 18, a conveyor beam holding the conveyor chain (60), and a drive unit arranged to drive the conveyor chain (60).

* * * * *